(12) United States Patent
Geoffrey

(10) Patent No.: US 7,519,825 B2
(45) Date of Patent: Apr. 14, 2009

(54) ELECTRONIC CERTIFICATION AND AUTHENTICATION SYSTEM

(75) Inventor: Mohammed Alawi Geoffrey, Jeddah (SA)

(73) Assignee: House of Development LLC, Jeddah (SA)

( * ) Notice: Subject to any disclaimer, the term of this patent is extended or adjusted under 35 U.S.C. 154(b) by 601 days.

(21) Appl. No.: 10/905,687

(22) Filed: Jan. 17, 2005

(65) Prior Publication Data

US 2006/0161779 A1  Jul. 20, 2006

(51) Int. Cl.
*H04L 9/00* (2006.01)

(52) U.S. Cl. .................. 713/181; 713/150; 713/156; 713/175; 713/176; 713/178; 713/180; 705/62

(58) Field of Classification Search .............. 713/150, 713/156, 178, 175, 180, 181; 705/62
See application file for complete search history.

(56) References Cited

U.S. PATENT DOCUMENTS

| | | | | |
|---|---|---|---|---|
| 5,604,802 A * | 2/1997 | Holloway | .................... | 705/66 |
| 5,606,609 A * | 2/1997 | Houser et al. | ............... | 713/179 |
| 5,615,268 A * | 3/1997 | Bisbee et al. | ............... | 713/176 |
| 5,660,176 A * | 8/1997 | Iliff | ............................ | 600/300 |
| 5,661,805 A * | 8/1997 | Miyauchi | ................... | 713/176 |
| 5,805,702 A * | 9/1998 | Curry et al. | .................... | 705/66 |
| 5,872,848 A * | 2/1999 | Romney et al. | ............. | 713/176 |
| 5,933,498 A * | 8/1999 | Schneck et al. | ............... | 705/54 |
| 5,946,660 A * | 8/1999 | McCarty et al. | ................ | 705/5 |
| 6,105,007 A * | 8/2000 | Norris | ......................... | 705/38 |
| 6,105,013 A * | 8/2000 | Curry et al. | .................... | 705/65 |
| 6,148,093 A * | 11/2000 | McConnell et al. | ......... | 382/119 |
| 6,189,009 B1 * | 2/2001 | Stratigos et al. | ............... | 707/10 |
| 6,216,116 B1 * | 4/2001 | Barkan et al. | ................ | 705/76 |
| 6,237,095 B1 * | 5/2001 | Curry et al. | ................. | 713/178 |
| 6,253,322 B1 * | 6/2001 | Susaki et al. | ................ | 713/170 |
| 6,314,409 B2 * | 11/2001 | Schneck et al. | ............... | 705/54 |
| 6,327,656 B2 * | 12/2001 | Zabetian | ..................... | 713/176 |
| 6,353,812 B2 * | 3/2002 | Frankel et al. | ................ | 705/44 |
| 6,367,013 B1 * | 4/2002 | Bisbee et al. | ............... | 713/178 |
| 6,431,439 B1 * | 8/2002 | Suer et al. | .................... | 235/380 |
| 6,446,050 B1 * | 9/2002 | Kondo et al. | .................. | 705/51 |
| 6,725,209 B1 * | 4/2004 | Iliff | ............................ | 706/45 |
| 6,725,220 B2 * | 4/2004 | Stratigos et al. | ............... | 707/10 |
| 6,757,826 B1 * | 6/2004 | Paltenghe | ................... | 713/170 |
| 6,947,556 B1 * | 9/2005 | Matyas et al. | ................. | 380/29 |
| 6,978,380 B1 * | 12/2005 | Husain et al. | .................. | 726/4 |
| 6,990,513 B2 * | 1/2006 | Belfiore et al. | ............. | 709/203 |
| 7,024,562 B1 * | 4/2006 | Flink et al. | .................. | 713/186 |
| 7,039,805 B1 * | 5/2006 | Messing | .................... | 713/170 |
| 7,107,454 B2 * | 9/2006 | Mori et al. | ................... | 713/180 |
| 7,174,460 B2 * | 2/2007 | Horita et al. | ................ | 713/176 |
| 7,263,551 B2 * | 8/2007 | Belfiore et al. | ............. | 709/219 |
| 7,306,560 B2 * | 12/2007 | Iliff | ............................ | 600/300 |
| 7,395,436 B1 * | 7/2008 | Nemovicher | ................ | 713/193 |
| 2001/0011220 A1* | 8/2001 | Frankel et al. | ................ | 705/1 |
| 2001/0021926 A1* | 9/2001 | Schneck et al. | ............... | 705/54 |

(Continued)

*Primary Examiner*—David Garcia Cervetti
(74) *Attorney, Agent, or Firm*—Pearl Cohen Zedek Latzer, LLP

(57) ABSTRACT

The invention is an automated system that works in the data center of certification offices connected to the internet which enables a member of the any of the certification offices to certify his document electronically from a distance using a computer connected to the internet, digital pad, an electronic pen and a printer.

8 Claims, 6 Drawing Sheets

U.S. PATENT DOCUMENTS

| | | | |
|---|---|---|---|
| 2001/0025272 A1* | 9/2001 | Mori et al. | 705/76 |
| 2002/0059143 A1* | 5/2002 | Frankel et al. | 705/44 |
| 2002/0059425 A1* | 5/2002 | Belfiore et al. | 709/226 |
| 2002/0062291 A1* | 5/2002 | Zoka | 705/64 |
| 2002/0069179 A1* | 6/2002 | Slater et al. | 705/67 |
| 2003/0012374 A1* | 1/2003 | Wu et al. | 380/44 |
| 2003/0163428 A1* | 8/2003 | Schneck et al. | 705/51 |
| 2003/0172034 A1* | 9/2003 | Schneck et al. | 705/54 |
| 2004/0039912 A1* | 2/2004 | Borrowman et al. | 713/176 |
| 2004/0049463 A1* | 3/2004 | Kwon | 705/50 |
| 2004/0181756 A1* | 9/2004 | Berringer et al. | 715/530 |
| 2004/0205358 A1* | 10/2004 | Erickson | 713/200 |
| 2004/0255120 A1* | 12/2004 | Botti et al. | 713/170 |
| 2005/0038737 A1* | 2/2005 | Norris | 705/39 |
| 2005/0039018 A1* | 2/2005 | Wittkotter | 713/176 |
| 2005/0044369 A1* | 2/2005 | Anantharaman | 713/176 |
| 2005/0132195 A1* | 6/2005 | Dietl | 713/176 |
| 2005/0132196 A1* | 6/2005 | Dietl | 713/176 |
| 2006/0090203 A1* | 4/2006 | Husain et al. | 726/17 |
| 2006/0178997 A1* | 8/2006 | Schneck et al. | 705/50 |
| 2006/0184452 A1* | 8/2006 | Barnes et al. | 705/50 |
| 2007/0118732 A1* | 5/2007 | Whitmore | 713/155 |

* cited by examiner

ELECTRONIC CERTIFICATION AND AUTHENTICATION SYSTEM

BACKGROUND ART

The field of this invention is related to document security systems and particularly it relates to a new and developed way to verify the correctness and safety of documents information and signatures and stamps from fraud.

Current systems uses stickers, thermal stamps and water marks to discover fraud using the naked eye which imposes a threat to correctness and safety of these documents. It was revealed that there were many cases of fraud in these documents that uses the current systems.

From the above it is clear that there is a continuous urgent need to store the document information in a database and to save the encrypted information as a 2D barcode to overcome the document security problems which is accomplished by this invention which provide the capability to verify the correctness and safety of documents.

SUMMARY

The invention is an automated system that works in the data center of certification offices connected to the internet which enables a member of the any of the certification offices to certify his document electronically from a distance using a computer connected to the internet, digital pad, an electronic pen and a printer.

Administrators and registrars use the system to record the registrars and members information and enroll their signatures on a digital pad using an electronic pen and storing the information and the signatures in the database. A member would use the system to enter his document information and enroll his signature on the digital pad using the electronic pen, the system checks the validity of the signature by compare the signature with the signatures data with the enrolled signatures of the members. If the signature is valid the document information is saved in the data center of the certification offices for retrieval when a verification request is needed to check that the document is free from fraud and a 2D barcode is generated. The 2D barcode consist of the information of the document after encrypting the information using one of the two. The member uses the system to print his document information signatures, stamps and the 2D barcode on his printer or authorize someone else to print it in a different place. A verifier would use the system in which it's application run on a computer not connected to the internet and a scanner to scan the document read the 2D barcode decrypt the document information with the other key, decompress the information and display it to verify its correctness and safe from fraud from fraud

DESCRIPTION OF DRAWINGS

In order that the invention may be more readily understood and put into practical effect, a preferred example of the invention will now be described with reference to the accompanying drawings, in which.

DETAILED DESCRIPTION

Disclosure of Invention

Figure 1:
FIG. 1 illustrates a flat image of a handwritten signature of a person captured by a digital pad and an electronic pen.

By looking at the defects in the current systems which is used to discover fraud by using the eye we find that this invention is parallel with other technologies since it provides a way to verify that documents information are correct and safe from fraud but this invention enables the user who wants to verify documents correctness and the safety to confirm documents fraud or not.

This invention consists of several modules as follows:

Main Module: runs on the application server which connects to database server in the data center of the certification offices that is connected to the Internet. The module updates it's data by connecting to other databases or by other modules. This module is activated by an Internet browser that runs on a PC. The user with this module can create the system key pair and enters administrators information and enroll their signatures.

Admin Module: runs on the application server that is connected to the Internet and is activated by an Internet browser that runs on a PC. The administrator from any where can use this module to do the following:

Checks the administrator number, password and signature to enter the module.

Enter Certification office information and stamp in the system.

Enter Certification office registrars' information and enroll their signatures.

Activate or deactivate Certification office registrars.

Provide Certification office registrars with user numbers and passwords.

Print Admin reports.

Registration Module: runs on the application server that is connected to the Internet and is activated by an Internet browser that runs on a PC. The registrar from any where can use this module to do the following:

Checks the registrar number, password and signature to enter the module.

Enter companies' information required for certification like letter Header, letter footer and stamp.

Register companies' members' information and enroll their signatures on a digital pad and an electronic pen connected to a PC.

Activate or deactivate signatories or companies' members.

Provide companies members with their numbers and passwords.

Print Member transaction reports.

Certification Module: runs on the application server that is connected to the Internet and is activated by an Internet browser that runs on a PC. The member from any where can use this module to do the following:

Checks the member number, password and signature before entering the module.

Enter and save the document information that needs to certify.

Enroll member signature on the digital pad and an electronic pen to certify the signature.

The system compares the enrolled signature patterns with the member signatures patterns stored in the database.

If the signature is correct the system displays the member signature, his company stamp, certification office stamp, Certification number, Certification date, Certification time and a 2D barcode on the Internet browser.

The member can print the certified letter displayed on his printer that is connected to his PC.

The member can authorize printing to another person.

The transaction amount is directly deducted from the member account.

All of the certified document information is saved in the database to verify its correctness and safety from fraud.

Authorization Module: runs on the application server that is connected to the Internet and is activated by an Internet browser that runs on a PC. The authorized person from any where can use this module to do the following:

Checks the Authorized person number, password before entering the module.

The member can print the certified letter displayed on his printer that is connected to his PC.

All of the authorization information is saved in the database for future retrieval.

Online Verification Module: runs on the application server that is connected to the Internet and is activated by an Internet browser that runs on a PC. The verifier from any where can use this module to do the following:

Checks the Verifier number, password before entering the module.

Retrieve the document to verify by entering the document certification number.

Compare or print the information displayed to verify its correctness and safety from fraud.

Offline Verification Module: runs on the verifier PC and is activated by running that module on a stand alone PC connected to a scanner. The verifier can use this module to do the following:

Scan the certified document with scanner.

Read the information in the 2D barcode after (decrypting the random key with the system decryption key, decrypting the compressed document information with the random key) or (decrypting the hash code with the system decryption key and comparing it with compressed document information Hash code), decompress the compressed document information and display it.

Compare or print the information displayed to verify its correctness and safety from fraud.

The invention is unique since there is no identical system like it in any shape or form among the current systems but it contains all of its benefits and on these bases the claims were built to be different than the other technologies in the formation of the numerous invention claims.

Figure 2:
FIG. 2 illustrates a flat image of a company stamp.
Figure 3:
FIG. 3 illustrates a flat image of a certification office stamp.
Figure 4:
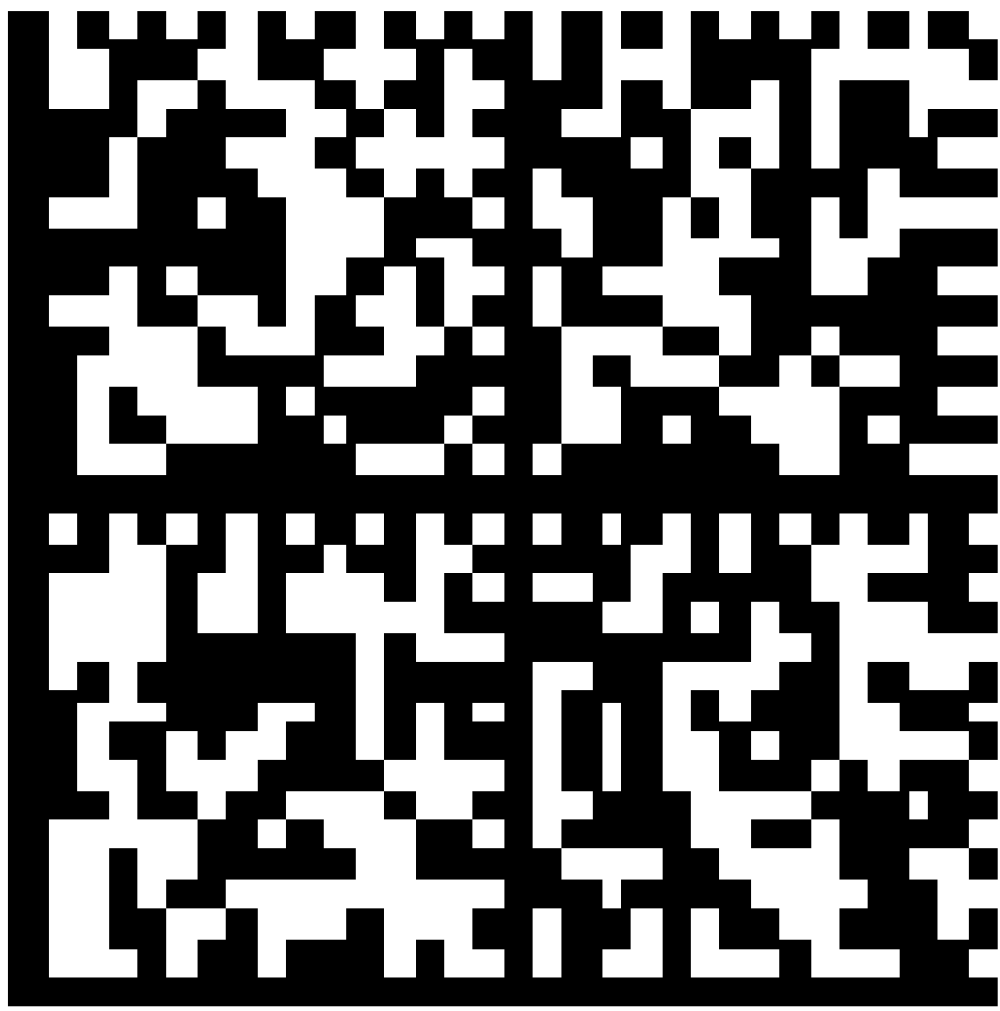
FIG. 4 illustrates a flat image of 2D barcode.
Figure 5:
FIG. 5 illustrates a flat image of a digital pad and an electronic pen.
Figure 5:

Best Mode for Implementing the Invention:

The following will refer back to the drawings and best mode for Carrying out the Invention. The modules of this invention are linked to each other and share one database and work as one module. With the Main module, the Admin module and the Registration module the registration of certification offices, administrator, registrars, companies and members in certification offices database and enrolling 3 signatures or more as referenced in FIG. 1 to every Admin, registrar and member using a digital pad and an electronic pen as referenced in FIG. 5. Members using the certification module can enter document information enroll their signatures on the digital pad with the electronic pen connect to his PC after that the system compares signature patterns with the signatures patterns stored in the database to verify the correctness of the signature and if OK the information is stored in the database This makes the Certification process complete. Member can use the system to print the member signature as referenced in FIG. 1, his company stamp as referenced in FIG. 2, certification office stamp as referenced in FIG. 3, Certification number, Certification date, Certification time and a 2D barcode as referenced in FIG. 4 using a printer connected to his PC. This makes the Authentication process complete. Member can authorize any person any where to print the certified document.

The 2D barcode which is a standard one but it is different in the way it is generated by one of two methods in this invention. It has bars placed on the horizontal and vertical dimensions. As known about these 2D barcodes that these bars parts are generated and printed using a 2D barcode generation program which transfer the information to bars. As known about the cryptography using two keys a key for encryption and a key for decryption which is known as PKI. As also known about the Hash code programs that generate a unique code for any information data.

The system compresses the document information, (encrypt the compressed document information with system generated random key, encrypt the random key with the system encryption key and generate the 2D barcode from the encrypted random key and the encrypted compressed document information) or (encrypt the compressed document information Hash code with the system encryption key generate the 2D barcode from the encrypted Hash code and the compressed document information).

The 2D barcode contains the following information:

Document information.

Member Name

Company Name

Certification office Name

Certification office stamp

System decryption key name

Random key or Hash code.

Figure 6:
FIG. 6 illustrates a flat image of a scanner inserted.

The Offline Verification module enables verifiers to read the 2D barcode after scanning the document using a scanner as referenced in FIG. 6 (decrypt the random key by the system decryption key, decrypt the compressed document information using the random key) or (decrypting the hash code with the system decryption key and comparing it with compressed document information hash code), decompress the compressed document information and as mentioned earlier the module display it to so the verifier can compare with the printed document information to verify the correctness and safety of the document from fraud.

The verifier can verify using the Online module through the Internet from displaying the certified document information to verify the correctness and safety of the document from fraud.

Scope of implementing the invention using the above claims can be used in securing the following: Chamber of Commerce and Industry documents, Banks and financial documents, Government and legal documents, Medical and insurance documents and all documents that need to be secured from fraud.

What is claimed is:

1. A method comprising:
receiving document information to be certified;
obtaining a signature from a member using a digital pad and an electronic pen;
comparing the obtained signature against at least one previously registered signature, and if the obtained signature matches the previously registered signature then:
selecting a previously stored certification image based on said registered signature;
encrypting the document information using a random key;
encrypting the random key using a system encryption key, wherein said encrypted random key is capable of being decrypted using a system decryption key;
generating a two-dimensional barcode coded to represent the encrypted document information and the encrypted random key; and
printing the document information, the previously stored certification image, and the two-dimensional barcode.

2. The method of claim 1, wherein the certification image is selected from the group consisting of: a member signature, a company stamp, and a certification office stamp.

3. The method of claim 1, further comprising storing said document information and an identification associated with the registered signature in a database.

4. The method of claim 1, further comprising:
reading the two-dimensional barcode using a barcode scanner;
decoding the two-dimensional barcode to retrieve the encrypted document information and the encrypted random key;
decrypting the encrypted random key using said system decryption key;
decrypting the encrypted document information using the random key to obtain the document information; and
displaying the document information, thereby enabling comparison between a document bearing the two-dimensional barcode and the displayed document information.

5. A system comprising:
an input device to receive document information corresponding to a document to be certified;
an electronic pen and a digital pad to receive a signature from a user;
a storage device to store a plurality of registered signatures;
a processor to compare the received signature against registered signatures and if the received signature matches at least one registered signature, then to:
select from said storage device a certification image based on said registered signature,
encrypt the document information using a random key;
encrypt the random key using a system encryption key, wherein said encrypted random key is capable of being decrypted using a system decryption key, and
generate a two-dimensional barcode coded to represent the encrypted document information and the encrypted random key; and
a printer to print the document information, the previously stored certification image, and the two-dimensional barcode.

6. The system of claim 5, wherein the certification image is selected from the group consisting of: a member signature, a company stamp, and a certification office stamp.

7. The system of claim 5, wherein said storage device is further to store said document information and an identification associated with the registered signature in a database.

8. The system of claim 5, further comprising a verification unit, said verification unit comprising:
a scanner to read the two-dimensional barcode;
a processor to:
decode the two-dimensional barcode to retrieve the encrypted document information and the encrypted random key,
decrypt the encrypted random key using said system decryption key, and
decrypt the encrypted document information using the random key to obtain the document information; and
a display to display the document information to a user, thereby enabling the user to compare the document bearing the two-dimensional barcode and the displayed document information.

* * * * *